(12) United States Patent
Hayashi et al.

(10) Patent No.: US 10,656,324 B2
(45) Date of Patent: May 19, 2020

(54) DISPLAY DEVICE

(71) Applicant: SHARP KABUSHIKI KAISHA, Sakai, Osaka (JP)

(72) Inventors: Tokumi Hayashi, Sakai (JP); Tomoya Ide, Sakai (JP); Shigenori Morioka, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/368,515

(22) Filed: Mar. 28, 2019

(65) Prior Publication Data
US 2019/0302351 A1 Oct. 3, 2019

(30) Foreign Application Priority Data
Mar. 30, 2018 (JP) ................. 2018-067205

(51) Int. Cl.
  *G02B 6/00* (2006.01)
  *F21V 8/00* (2006.01)
(52) U.S. Cl.
  CPC ......... *G02B 6/0085* (2013.01); *G02B 6/0051* (2013.01); *G02B 6/0055* (2013.01); *G02B 6/0083* (2013.01); *G02B 6/0088* (2013.01)
(58) Field of Classification Search
  CPC .................. G02B 6/0085; G02B 6/0083
  USPC ........................................... 362/615
  See application file for complete search history.

(56) References Cited

U.S. PATENT DOCUMENTS

| | | | |
|---|---|---|---|
| 2008/0170177 A1* | 7/2008 | Chen ............. | G02B 6/0068 349/64 |
| 2010/0060816 A1 | 3/2010 | Fukai et al. | |
| 2014/0002969 A1* | 1/2014 | Hwang ........... | H05K 5/0017 361/679.01 |
| 2019/0094456 A1* | 3/2019 | Lee .............. | G02F 1/1368 |

FOREIGN PATENT DOCUMENTS

| | | |
|---|---|---|
| JP | 2007-287463 A | 11/2007 |
| JP | 2010-061027 A | 3/2010 |
| JP | 2013-015637 A | 1/2013 |
| JP | 5635322 B2 | 12/2014 |

* cited by examiner

*Primary Examiner* — Christopher M Raabe
(74) *Attorney, Agent, or Firm* — ScienBiziP, P.C.

(57) ABSTRACT

A display device includes a display panel and a backlight. The display panel includes a first substrate, a second substrate, and a heatsink. The first substrate includes a second substrate non-overlapping portion on which the second substrate is not disposed but a driving component is disposed. The backlight includes a light guide plate and a light source. The light source emits light toward an end surface of the light guide plate. The heatsink includes a display panel overlapping portion, a light source overlapping portion, and a connecting portion. The display panel overlapping portion is on a rear surface of the first substrate at least over an area corresponding to the driving component. The light source overlapping portion is on a side of the backlight remote from the display panel. The connecting portion connects the display panel overlapping portion and the light source overlapping portion to each other.

10 Claims, 6 Drawing Sheets

DISPLAY DEVICE

CROSS REFERENCE TO RELATED APPLICATION

This application claims priority from Japanese Patent Application No. 2018-067205 filed on Mar. 30, 2018. The entire contents of the priority application are incorporated herein by reference.

TECHNICAL FIELD

The technology disclosed herein relates to a display device.

BACKGROUND

A planar thin display device used in an electronic device usually includes a display panel having a display surface on which an image is displayed, a driving component (such as an integrated circuit driver) for displaying an image, and a backlight that applies light to the rear surface of the display panel.

Known types of backlights include a direct-lit backlight in which the light sources are disposed on the rear side of the display panel and an edge-lit backlight (or a side-lit backlight) in which the light sources face the end surface of the light guide plate such that the backlight emits planar light. The edge-lit backlight is superior in terms of thickness reduction capability. However, in the edge-lit backlight, LEDs (light emitting diodes), which are the light sources, are concentrated in a local area. The LEDs may be excessively heated when the backlight is in continuous operation over a long time period, making the lighting state of the LEDs unstable or causing the light guide plate to deform. This may result in uneven luminance or uneven brightness, for example, leading to a decrease in the display quality of the display panel.

To solve the problem, a technique for heat dissipation has been developed to suppress an increase in temperature of the LEDs and portions around the LEDs. For example, Japanese Patent No. 5635322 discloses a liquid crystal display device including a graphite composite film having high heat conductivity. The graphite composite film is attached to an outer surface of a frame that has a light-emitting module including LEDs on an inner surface thereof. The neat from the LEDs is dissipated through the frame.

A COG (Chip On Glass) display device in which a driving component for displaying an image is directly mounted on a periphery of a substrate of the display panel is widely employed in electronic devices that have been demanded to have a smaller size and a lighter weight, such as tablet computers, digital cameras, and smart phones.

The driving component generates heat when driven. If the heat is not sufficiently dissipated, the service life of the driving component would be shortened, or the driving reliability would be lowered. Furthermore, in the display device including the driving component that is mounted on the substrate of the liquid crystal panel by COG technology, the liquid crystal panel may be heated to a temperature above the liquid crystal transition temperature by the heat. In such a case, the display quality of the image is lowered. Furthermore, if a finger print sensor or the like is disposed around the driving component, the heated driving component may cause low temperature burn or malfunction, for example.

In recent years, the driving component generates more heat as the number of LEDs and a load on the driving component increase due to an increase in the resolution of the display image and the faster driving speed of the driving component. Furthermore, as the electronic devices are widely used, higher heat dissipation performance is required to enable the display device to properly operate under various circumstances. In particular, a display device including components, such as a cover glass and a touch panel, on a front side of the display panel is more likely to have the above-described problem, because a space between the components is small and heat is likely to stay in the space. Under such a circumstance, the heat dissipation performance of the display device is demanded to be further improved.

SUMMARY

The technology described herein was made in view of the above circumstances. An object is to provide a display device having high heat dissipation performance.

The technology disclosed herein relates to a display device including a display panel and a backlight. The display panel includes a first substrate, a second substrate, and a heatsink. The second substrate is on the first substrate. The backlight faces the first substrate of the display panel. The heatsink includes a display panel overlapping portion, a light source overlapping portion, and a connecting portion. The display panel overlapping portion is on a rear surface of the first substrate at least over an area corresponding to the driving component. The light source overlapping portion is on a side of the backlight remote from the display panel beyond the light source. The connecting portion connects the display panel overlapping portion and the light source overlapping portion to each other. The first substrate includes a second substrate non-overlapping portion not having the second substrate thereon and having a driving component thereon. The backlight includes a light guide plate that is a plate-like member facing the display panel and a light source that faces an end surface of the light guide plate and is configured to emit light toward the end surface.

In this configuration, heat generated by the driving component is transferred to the display panel overlapping portion of the heatsink through the first substrate and is diffused and dissipated through the display panel overlapping portion. Furthermore, the heat generated by the light source is diffused and dissipated through the light source overlapping portion of the heatsink. Furthermore, the heat transferred to the display panel overlapping portion and the light source overlapping portion is partly diffused to the connecting portion and is dissipated through the connecting portion.

As described above, the heatsink, which has conventionally been disposed around the backlight, is extended to the rear surface of the display panel (first substrate). This allows not only the heat generated at the light source and the light source board but also the heat generated at the driving component to be efficiently dissipated by one heatsink. This reduces the possibility that the temperature of the display device will be increased by the heat from the driving component and the light source.

According to the technology disclosed herein, a display-device having high heat dissipation performance is provided.

DETAILED DESCRIPTION

First Embodiment

Figure 1:
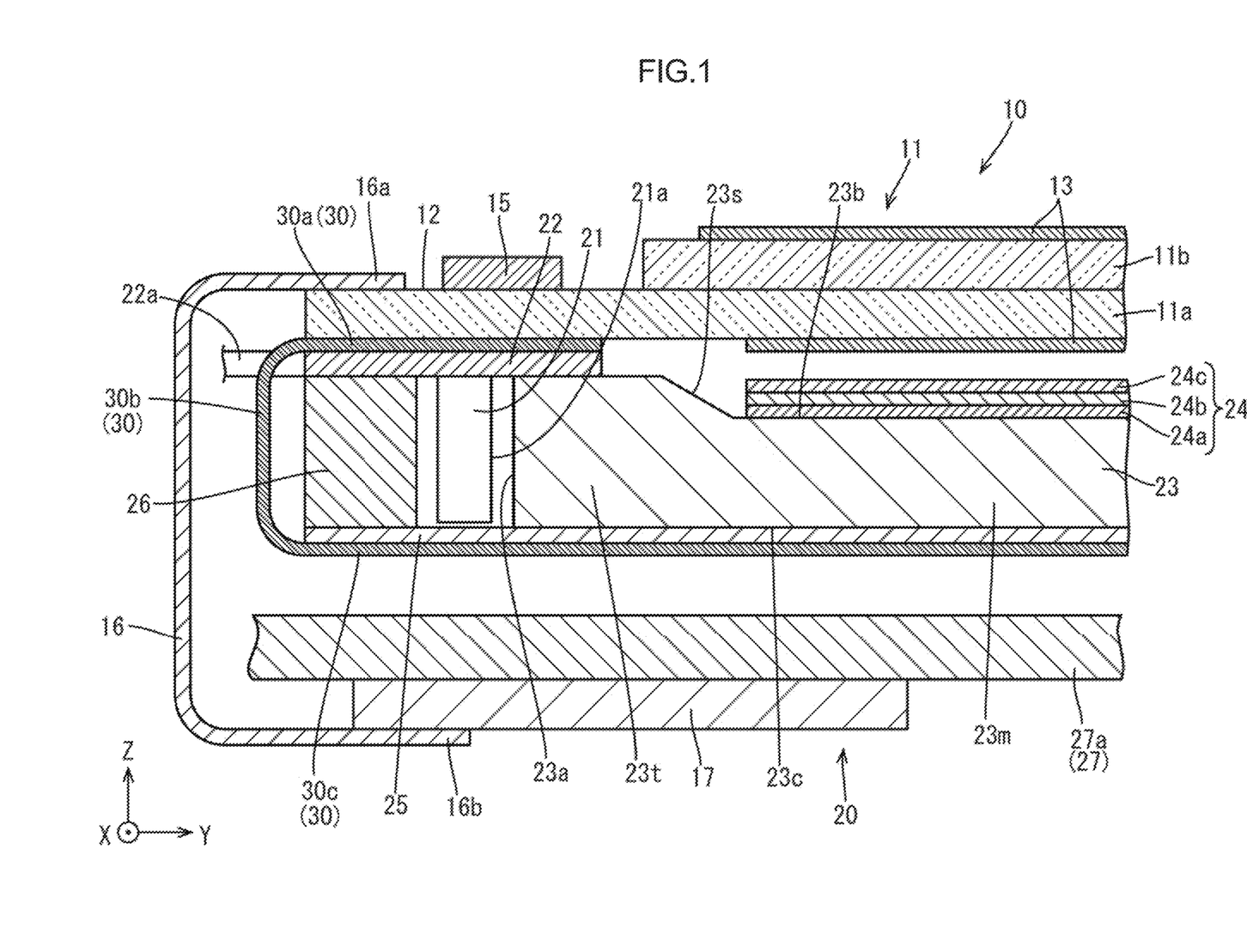
FIG. 1 is a magnified vertical cross-sectional view illustrating main components of a liquid crystal display device according to a first embodiment.

A first embodiment is described with reference to FIG. 1. In this embodiment, a liquid crystal display device (one example of a display device) 10 including a liquid crystal panel 11 as a display panel is described as an example. In FIG. 1, Y and Z axes are indicated. The X axis indicates a direction perpendicular to the sheet. The up and down direction is based on FIG. 1. The upper side in FIG. 1 is a front side and the lower side in FIG. 1 is a lower side.

As illustrated in FIG. 1, the liquid crystal display device 10 has an oblong thin box-like overall shape and includes a liquid crystal panel (one example of a display panel) 11, which is configured to display an image, and a backlight 20, which is disposed on a rear side of the liquid crystal panel 11 and configured to apply display light to the liquid crystal panel 11. The liquid crystal panel 11 and the backlight 20 are held in a housing (not illustrated). The liquid crystal display device 10 according to the embodiment may be used in a mobile information terminal (such as a mobile phone, a smart phone, and a tablet personal computer), an in-vehicle information terminal (such as a stationary car navigation system and a mobile car navigation system), or various electronic devices such as a mobile game console.

The liquid crystal panel 11 has an oblong plate-like overall shape. The short side direction thereof matches the X axis direction, the long-side direction thereof matches the Y axis direction, and the thickness direction thereof matches the Z axis direction. The front surface of the liquid crystal panel 11 is a display surface. The display surface has a display area (active area) on which am image is displayed at the central portion and a non-display area (non-active area) where an image is not displayed at the frame-shaped (ring-shaped) outer peripheral portion surrounding the display area.

The liquid crystal panel 11, which has a known configuration, includes two oblong substrates 11a and 11b attached to each other with a predetermined gap therebetween and a liquid crystal layer (not illustrated) disposed between the substrates 11a and 11b. The substrates 11a and 11b each include a nigh light transmission glass substrate formed of an alkali-free glass or a silica glass and multiple films (not illustrated in detail), which are formed by photolithography, on the glass substrate.

One of the substrates that is on the rear side (lower side in FIG. 1) is the array substrate 11a (one example of a first substrate). Switching devices (TFTs, for example) connected to source lines and gate lines, which are perpendicular to each other, pixel electrodes connected to the switching devices, and an alignment film, for example, are disposed on the array substrate 11a. The other of the substrates that is on the front side (upper side in FIG. 1) is the CF substrate 11b (one example of a second substrate). A color filter including a R (red) coloring portion, a G (green) coloring portion, and a B (blue) coloring portion, for example, in a predetermined order, a counter electrode, and an alignment film, for example, are disposed on the CF substrate 11b. Image data and various control signals for displaying images are supplied from a control circuit board 17, which will be described later, to the source lines, the gate lines, and the counter electrode, for example. A polarizing plate 13 is disposed on an outer surface of each of the substrates 11a and 11b.

The length of the CF substrate 11b in the short-side direction (X axis direction) is substantially equal to that of the array substrate 11 and the length of the CF substrate 11b in the long-side direction (Y axis direction) is smaller than that of the array substrate 11a. The substrates 11a and 11b are disposed one above the other such that the array substrate 11a has a CF substrate non-overlapping portion (one example of a second substrate non-overlapping portion) 12 at the end (left end portion in FIG. 1) in the long-side direction (Y axis direction) where the CF substrate 11b does not overlap the array substrate 11a over a predetermined area in the long-side direction. In other words, the CF substrate non-overlapping portion 12 in a belt-like shape extends in the short-side direction (X axis direction) of the liquid crystal panel 11.

The display area is located at a portion where the CF substrate 11b and the array substrate 11a overlap each other. The entire area of the CF substrate non-overlapping portion 12 of the array substrate 11a is a non-display area. A driver (one example of a driving component) 15, which will be described later, and a flexible board 16 for signal transmission are connected to the CF substrate non-overlapping portion 12, which is located at the end portion of the array substrate 11a.

The liquid crystal panel 11 is configured to display an image by using light from the backlight 20, and the front side thereof is a light exit side.

The backlight 20 has a block-like shape having an oblong overall shape in plan view as the liquid crystal panel 11. The backlight 20 includes multiple LEDs 21 (Light Emitting Diodes), which are light sources, an LED board 22 (one example of a light source board) on which the LEDs 21 are mounted, a light guide plate 23 that guides the light from the LEDs 21, a layered optical sheet 24 on the front surface of the light guide plate 23, a reflection sheet 25 on the rear surface of the light guide plate 23, a frame 26, and a chassis 27.

The backlight 20 is an edge-lit (side-lit) backlight in which the LEDs 21 (LED board 22) are disposed along the short-side end surface of the light guide plate 23 (end surface extending in the X axis direction) such that light is applied to the light guide plate 23 through only one side. In the backlight 20, light from the LEDs 21 is converted into planar light and output toward the liquid crystal panel 11, which is located at the front side. In other words, the front side of the backlight 20 is a light exit side. The LEDs 21 (LED board 22) are located in the liquid crystal display device 10 on the same side as the CF substrate non-overlapping portion 12. Hereinafter, the components of the backlight 20 are sequentially described.

The LEDs 21 each include a substrate fixed to the plate surface of the LED board 22, which will be described later, and an LED chip (LED device), which is a semiconductor light-emitting device. The LED chip on the substrate is sealed with a resin material. The LED chip on the substrate emits light having one dominant emission wavelength, particularly emits monochromatic blue light. The resin material sealing the LED chip contains phosphors, which emit predetermined colors of light when excited by blue light from the LED chip, in a dispersed state to allow the LED 21 to emit white light as a whole. The LED 21 is a side-lit LED in which the side surface adjacent to the surface in contact with the LED board 22 is a light emitting surface 21*a*.

The light emitted by the LED 21 through the light emitting surface 21*a* radiates from the optical axis (has directivity). In this embodiment, the optical axis of the emitted light is substantially perpendicular to a central portion of the light emitting surface 21*a*.

The LED board 22 includes a flexible film-like (sheet) base member formed of an insulating material on which LEDs 21 are arranged at intervals and a wiring pattern formed of a metal film, such as a copper foil, through which power is supplied to the LEDs 21. The surface of the LED board 22 on which the LEDs 21 are mounted faces the rear side (side remote from the liquid crystal panel 11).

The length of the long side of the LED board 22 is substantially equal to the length of the short side (dimension in the X axis direction) of the light guide plate 23, which will be described later, and the length of the short side thereof is longer than the distance between the frame 26, which will be described later, and the light guide plate 23. One of the two long-side end portions of the LED board 22 is located on the front surface of the light guide plate 23 along one of the two short-side end portions of the light guide plate 23 and the other is located on the front surface of the frame 26. In other words, the LED board 22 extends along the short side of the backlight 20 (in the X axis direction), and the LEDs 21 face the short-side end surface (light input surface 23*a*) of the light guide plate 23, which will be described later, with the light emitting surfaces 21*a* thereof being parallel to the short-side end surface.

The light guide plate 23 is formed of a transparent synthetic resin, for example, such as an acrylic resin or polycarbonate, and has a substantially oblong plate-like shape in plan view. The long-side direction (longitudinal direction) of the light guide plate 23 matches the Y axis direction, the short-side direction (width direction) thereof matches the X axis direction, and the thickness direction perpendicular to the plate surface matches the Z axis direction.

As described above, a left short-side end surface of the light guide plate 23 in FIG. 1 is the light input surface 23*a*, which is parallel to the light emitting surfaces 21*a* of the LEDs 21 and to which the light from the LEDs 21 is applied. In this embodiment, an upper plate surface (front surface) of the light guide plate 23 is the light exit surface 23*b* through which the light is output toward the liquid crystal panel 11 and a lower plate surface (rear surface) thereof is a reflection surface 23*c* that reflects the light, which has traveled in the light guide plate 23 to the lower surface (rear surface), toward the light exit surface 23*b*.

A portion of the light guide plate 23 around the light input surface 23*a* is a thicker portion 23*t* having a larger thickness than the other portion (main portion 23*m*). The thicker portion 23*t* extends over the entire length of the light guide plate 23 in the X axis direction and allows the density of the light from the LEDs 21 to increase at the main portion 23*m*. The thicker portion 23*t* is an end portion of the light guide plate 23 adjacent to the light input surface 23*a* and has the light exit surface 23*b* located above the light exit surface 23*b* of the other portion over the entire length in the X axis direction. The light exit surface 23*b* of the thicker portion 23*t* is parallel to the reflection surface 23*c*. The light exit surface 23*b* of the thicker portion 23*t* and the light exit surface 23*b* of the main portion 23*m* are connected to each other by an inclined portion 23*s* sloping upward from the main portion 23*m* to the thicker portion 23*t*. The inclined portion 23*s* is located in the non-display area (non-active area).

The above-described LED board 22 is fixed to the front surface (light exit surface 23*b*) of the thicker portion 23*t* of the light guide plate 23.

A three-layered optical sheet 24 is disposed on the front surface (light exit surface 23*b*) of the main portion 23*m* of the light guide plate 23. The optical sheet 24 has a flat oblong sheet-like shape and the long-side direction thereof matches the Y axis direction and the short-side direction thereof matches the X axis direction.

The optical sheet 24 disposed between the light guide plate 23 and the liquid crystal panel 11 transmits the outgoing light from the light guide plate 23 and allows the light to travel toward the liquid crystal panel 11 while exerting predetermined optical effects on the transmitted light.

The optical sheet 24 in this embodiment includes a diffusing sheet 24*a*, a lens sheet 24*b*, and a reflection polarizing sheet 24*c*, in this order from the lower side. The diffusing sheet 24*a* includes diffusing particles for diffusing light in a dispersed state in a substantially transparent base member formed of a synthetic resin. The diffusing sheet 24*a* is directly located on the light guide plate 23 and is the closest in the optical sheet 24 to the light guide plate 23.

The reflection sheet 25 is disposed on the rear surface (the reflection surface 23*c* at the side remote from the liquid crystal panel 11) of the light guide plate 23. The reflection sheet 25 is formed of a synthetic resin sheet material and has a white surface having high light reflectance. The reflection sheet 25 efficiently reflects the light leaked from the light guide plate 23 through the reflection surface 23*c* toward the front side (light exit surface 23*b*). The reflection sheet 25 has an oblong shape in plan view and most of the central area thereof is disposed on the rear surface of the light guide plate 23. The outer peripheral portion of the reflection sheet 25 protrudes from the outer end surface of the light guide plate 23. This allows the reflection sheet 25 to efficiently directly receive the light from the LEDs 21 at the portion near the LED board 22 and reflect the light toward the light input surface 23*a*.

The frame 26 (one example of an opposing member) is formed of a synthetic resin and has an oblong frame-like overall shape. The outer dimension of the frame 26 is substantially equal to the outer dimension of the array substrate 11*a* of the liquid crystal panel 11 in plan view. The height of the frame 26 is equal to the height of the thicker portion 23*t* of the light guide plate 23. The long-side direction of the frame 26 matches the Y axis direction, the short-side direction thereof matches the X axis direction, and the height direction thereof matches the Z axis direction. The frame 26 has the LED board 22 on the upper surface thereof with an adhesive tape (not illustrated) therebetween and supports the LED board 22 from the rear side. The frame 26 encloses the LEDs 21 and the light guide plate 23. The reflection sheet 25 is attached to the lower surface of the frame 26 with an adhesive tape (not illustrated) therebetween. This allows the components of the backlight 20 to be fixed to each other through the frame 26 and to be held in the frame 26.

The above-described components are supported by the chassis 27. The chassis 27 is formed of a metal material such as an aluminum plate and an electro galvanized steel sheet (SECC). Although the overall shape of the chassis 27 is not illustrated in the drawings, the chassis 27 has an oblong shape in plan view and a substantially box-like shape with a front opening. The chassis 27 includes a bottom portion 27a having a substantially oblong shape slightly larger than the outer dimension of the frame 26 in plan view and side walls (not illustrated) extending upward from the edges of the bottom portion 27a. The long-side direction of the bottom portion 27a matches the Y axis direction and the short-side direction thereof matches the X axis direction. On the rear surface of the bottom portion 27a, the control circuit board 17 for driving the driver 15, for example, is disposed.

Next, components connected to the liquid crystal panel 11 will be described. In FIG. 1, the driver 15 and the flexible board 16 are connected to the CF board non-overlapping portion 12 of the array substrate 11a of the liquid crystal panel 11, which is located on the front side of the backlight 20.

The driver 15 includes an LSI chip having a driving circuit therein. The driver 15 is configured to process input signals sent from the control circuit board 17, which is a signal source, through the flexible board 16, which will be described later, and generate output signals. The driver 15 outputs the output signals to the display area of the liquid crystal panel 11 and drives the liquid crystal molecules, which are display elements. The driver 15 generates heat when driven.

The driver 15 has a cuboidal shape and is mounted on the CF substrate non-overlapping portion 12 of the array substrate 11a of the liquid crystal panel 11 such that the long-side direction thereof matches the X axis direction and the short-side direction thereof matches the Y axis direction.

The flexible board 16 includes a sheet-like base member having an oblong shape in plan view and formed of an insulating and flexible synthetic resin such as polyimide and PET. On the base member, multiple wiring patterns (not illustrated) are routed. The flexible board 16 has a higher degree of bending freedom (flexibility, deformability) than a glass substrate, for example, and is readily bent or folded.

The flexible board 16, which is connected to the CF substrate non-overlapping portion 12 of the array substrate 11a of the liquid crystal panel 11, is located closer than the driver 15 to the edge in the Y axis direction (edge remote from the CF substrate 11b). The flexible board 16 is bent to have edges extending in the X axis direction. The flexible board 16 includes an end portion 16a connected to the front surface of the array substrate 11a of the liquid crystal panel 11, a portion covering a side wall (not illustrated) of the chassis 27, and an opposite end portion 16b connected to the control circuit board 17.

As described above, the control circuit board 17 is attached to the rear surface of the chassis 27 (outer surface remote from the liquid crystal panel 11) by screws (not illustrated), for example. The control circuit board 17 includes electronic components configured to send input signals to the driver 15, for example, on a substrate formed of phenolic paper or glass epoxy resin and a wiring line (conducting path) having a predetermined pattern (not illustrated) routed on the substrate.

The liquid crystal display device 10 of the embodiment includes a graphite sheet (one example of a heatsink) 30 that improves heat dissipation performance. The graphite sheet 30 is effective heat diffusing and dissipating member for a large area, because the graphite sheet 30 has higher heat conductivity than metals such as a copper and an aluminum, which have high heat conductivity, and has a smaller density than the metal. The graphite sheet 30 may include only graphite or may further include a resin sheet on both surfaces or one surface thereof. In this embodiment, the graphite sheet 30 has a three-layered structure including a PET layer of 10 μm, a graphite layer of 25 μm, and a PET of 10 μm. The graphite sheet 30 used in this embodiment has an in-plane thermal conductivity of 1500 to 1700 W/mk, a density of 1.8 to 2.0 g/cm$^2$. The thickness of the graphite layer may be 20 to 30 μm.

The graphite sheet 30 includes a liquid crystal panel overlapping portion 30a (one example of a display panel overlapping portion), a reflection sheet overlapping portion 30c (light source overlapping portion), and a connecting portion 30b connecting the liquid crystal panel overlapping portion 30a and the reflection sheet overlapping portion 30c to each other at the edges extending in the X axis direction over the entire length in the width direction (X axis direction). The liquid crystal panel overlapping portion 30a on the rear surface of the CF substrate non-overlapping portion 12 of the array substrate 11a included in the liquid crystal panel 11 covers substantially the entire area corresponding to the CF substrate non-overlapping portion 12. The reflection sheet overlapping portion 30c has an oblong shape substantially identical to the shape of the reflection sheet 25 and covers substantially the entire area of the rear surface of the reflection sheet 25.

As illustrated in FIG. 1, the connecting portion 30b protrudes outward from the liquid crystal panel 11 and the frame 26 (toward the left side in FIG. 1) and curves to enclose the short-side side surface (extending in the X axis direction) of the frame 26. The length of the connecting portion 30b is longer than the distance between two protrusion starting positions of the connecting portion 30b and is not fixed at any positions other than the boundary with the liquid crystal panel overlapping portion 30a and the boundary with the reflection sheet overlapping portion 30c. The connecting portion 30b is flexurally deformable and is spaced apart from the side surface of the frame 26.

The connecting portion 30b does not have to be spaced apart from the side surface of the frame 26 and may be positioned on and along the side surface of the frame 26 or only a portion of the connecting portion 30b may be separated apart from the side surface. Furthermore, a portion of the connecting portion 30b may be thermally connected to the chassis 27 located outside the frame 26 or to a housing (not illustrated) located outside the chassis 27.

The front surface of the liquid crystal panel overlapping portion 30a is fixed to the rear surface of the CF substrate non-overlapping portion 12 included in the array substrate 11a by an adhesive tape (not illustrated). Furthermore, the rear surface of the liquid crystal panel overlapping portion 30a is fixed to the front surface (upper surface) of the LED board 22 by an adhesive tape (not illustrated). The entire front surface (upper surface) of the LED board 22 is covered by the liquid crystal panel overlapping portion 30a. In other words, the liquid crystal panel overlapping portion 30a is sandwiched between and fixed to the array substrate 11a and the LED board 22 and thermally connected thereto.

The liquid crystal panel overlapping portion 30a does not have to be located over substantially the entire area of the CF substrate non-overlapping portion 12 on the rear surface of the array substrate 11a and may stretch beyond the CF substrate non-overlapping portion 12 or may stretch only a portion of the CF substrate non-overlapping portion 12. In short, the liquid crystal panel overlapping portion 30a has to be located over at least an area corresponding to the driver 15 to sufficiently dissipate heat and not over the display area (active area). Furthermore, the liquid crystal panel overlapping portion 30a does not have to be entirely sandwiched between the array substrate 11a and the LED board 22 and only a portion thereof may be sandwiched therebetween. Furthermore, the liquid crystal panel overlapping portion 30a may be spaced apart from the LED board 22.

The reflection sheet overlapping portion 30c is fixed to the rear surface (surface remote from the light guide plate 23) of the reflection sheet 25 by an adhesive tape (not illustrated). The reflection sheet overlapping portion 30c faces the bottom portion 27a of the chassis 27 with a space therebetween. In the backlight 20, the reflection sheet overlapping portion 30c may be in contact with both the reflection sheet 25 and the bottom portion 27a of the chassis 27 without a space therebetween. The reflection sheet overlapping portion 30c does not have to cover the entire rear surface of the reflection sheet 25 and may cover only a portion of the reflection sheet 25.

As described above, the graphite sheet 30 of the embodiment includes the liquid crystal panel overlapping portion 30a, which is one end portion thermally connected to the liquid crystal panel 11, the reflection sheet overlapping portion 30c, which is the other end portion thermally connected to the LEDs 21 of the backlight 20 and the surface of the light guide plate 23 remote from the liquid crystal panel 11, and the connecting portion 30b, which is the middle portion spaced apart from the liquid crystal panel 11 and the frame 26.

Although not illustrated, the connecting portion 30b has a cutout through which an extended portion 22a for supplying power or the like to the LED board 22 extends.

Instead of the adhesive tape, the graphite sheet 30 may include an adhesive layer, a bonding layer, or an adhesive agent to fix the graphite sheet 30. Furthermore, since the graphite sheet 30 is very thin, the graphite sheet 30 may integrally include a supporting layer formed of resin, for example.

The graphite sheet 30 may be disposed over a possible largest area to have higher heat diffusion and dissipation performance. Furthermore, the graphite sheet 30 may have a small thickness to reduce the size and the thickness of the liquid crystal display device 10, and the optimum thickness thereof is determined in view of balance with the heat dissipation performance.

The configuration of the liquid crystal display device 10 in the embodiment is as described above, and effects and advantages thereof will be described next.

The liquid crystal display device 10 of the embodiment includes the liquid crystal panel 11 including the array substrate 11a and the CF substrate 11b on the array substrate 11a, the backlight 20 facing the array substrate 11a of the liquid crystal panel 11, and the graphite sheet 30. The array substrate 11a includes the CF substrate non-overlapping portion 12 not having the CF substrate 11b thereon and having the driver 15 thereon. The backlight 20 includes the light guide plate 23 that is a plate-like member facing the liquid crystal panel 11 and the LED 21 that faces an end surface (light input surface 23a) of the light guide plate 23 and is configured to emit light toward the end surface. The graphite sheet 30 integrally includes the liquid crystal panel overlapping portion 30a on the rear surface of the array substrate 11a at least over an area corresponding to the driver 15, the reflection sheet overlapping portion 30c disposed on the side of the backlight 20 remote from the liquid crystal panel 11 beyond the LED 21 over the substantially entire area of the reflection sheet 25, and the connecting portion 30b connecting the liquid crystal panel overlapping portion 30a and the reflection sheet overlapping portion 30c to each other.

The side of the backlight 20 remote from the liquid crystal panel 11 is a lower area in FIG. 1. The lower area is located below the LEDs 21 and below the light guide plate 23 in the thickness direction of the backlight 20 or the Z axis direction. The side surface of the frame 26 (left side in FIG. 1) is not in the lower area.

In this configuration, the heat generated by the activated driver 15 is transferred to the liquid crystal panel overlapping portion 30a of the graphite sheet 30 through the array substrate 11a and is diffused and dissipated quickly by the graphite sheet 30, which has high thermal conductivity. Furthermore, the heat generated by the LEDs 21 is transferred to the reflection sheet overlapping portion 30c of the graphite sheet 30 through the reflection sheet 25 and is diffused and dissipated quickly toward the chassis 27. Furthermore, the heat transferred to the liquid crystal panel overlapping portion 30a and the reflection sheet overlapping portion 30c is partly diffused quickly to the connecting portion 30b and is efficiently dissipated through the connecting portion 30b, which has few nearby components.

As described above, in the liquid crystal display device 10 of the embodiment, the graphite sheet, which is traditionally attached only to the backlight, is extended to the rear surface of the liquid crystal panel 11 (array substrate 11a). This configuration allows not only the heat generated by the LEDs 21 and the LED board 22 but also the heat generated by the driver 15 to be efficiently taken out from the inner side (between the liquid crystal panel 11 and the backlight 20) of the liquid crystal display device 10 to the outer side and dissipated. In other words, with this configuration, the neat generated by the liquid crystal panel 11 (driver 15) and the heat generated by the LEDs 21 are both diffused and dissipated at one time through one graphite sheet 30.

Furthermore, since the graphite sheet 30 has higher heat conductivity than metals, which have high heat conductivity, as described above, the configuration in this embodiment exhibits higher heat dissipation effect than a known configuration in which neat is dissipated through a metal frame or a metal chassis. Furthermore, since the graphite sheet 30 has a lower density than metals and the graphite sheet 30 is flexible unlike metals, the graphite sheet 30 is light and is able to be flexibly shaped into a complex form. Specifically described, as in the embodiment, the graphite sheet 30, which has the portion disposed on the inner side of the liquid crystal display device 10 (between the liquid crystal panel 11 and the backlight 20) and the portion spaced apart from the side surface of the frame 26, is unlikely to increase the thickness or the width of the liquid crystal display device 10 and is unlikely to affect the surrounding components. The graphite sheet 30 is unlikely to impose design limitations on the liquid crystal display device 10.

Furthermore, in the liquid crystal display device 10 of the embodiment, the backlight 20 includes the LED board 22 on which the LEDs 21 are mounted, the LED board 22 extends along the plate surface (light exit surface 23b) of the light guide plate 23 adjacent to the liquid crystal panel 11, and the surface of the liquid crystal panel overlapping portion 30a remote from the array substrate 11a is located on the LED board 22. In this configuration, the heat generated by the activated LED 21 is transferred not only to the reflection sheet overlapping portion 30c but also to the liquid crystal panel overlapping portion 30a through the LED board 22, and the heat is diffused and dissipated through the liquid crystal panel overlapping portion 30a. In other words, the heat generated by the LEDs 21 is diffused and dissipated by one graphite sheet 30 through both the portion adjacent to the liquid crystal panel 11 and the portion adjacent to the backlight 20.

Furthermore, the backlight 20 of the embodiment includes the frame 26 on a side of the LED 21 remote from the light guide plate 23, and the connecting portion 30b of the graphite sheet 30 is entirely spaced apart from the frame 26. In this configuration, high heat dissipation efficiency is high, because the connecting portion 30b is distant from the heat source, the heat dissipation area is large, and heat is dissipated through the both surfaces of the connecting portion 30b.

In this embodiment, the liquid crystal display device 10 has high heat dissipation performance because the liquid crystal panel 11 and the backlight 20 are unlikely to be locally heated by heat generated by the driver 15 and the LEDs 21 (LED board 22). Such a configuration of the embodiment is advantageously applicable to display devices of mobile information terminals (such as a mobile phone, a smart phone, and a tablet personal computer), which have been developed to have higher definition, a smaller thickness, and a smaller frame width, because the configuration enables a heat dissipation structure to be installed in a small space.

Second Embodiment

Figure 2:
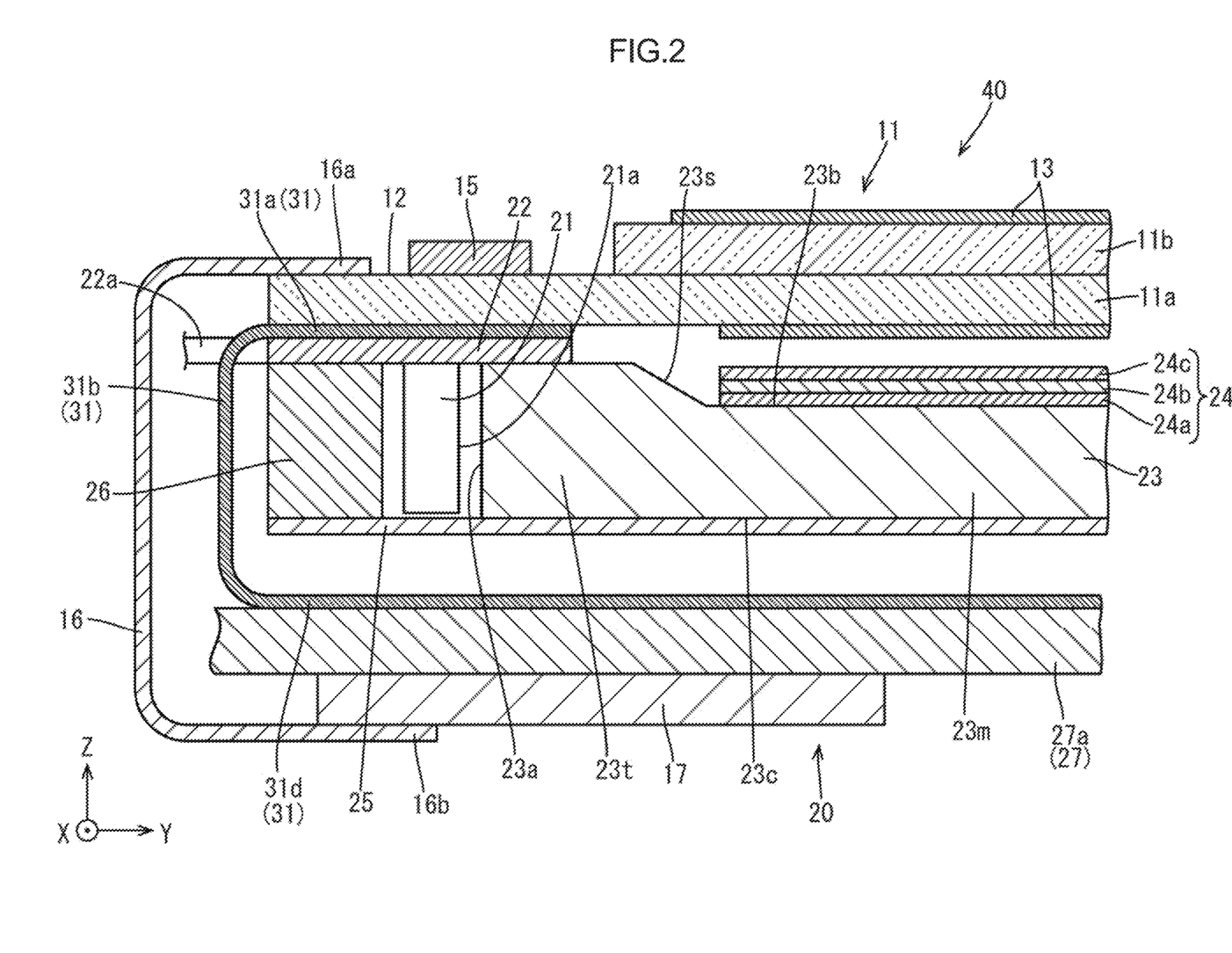
FIG. 2 is a magnified vertical cross-sectional view illustrating main components of a liquid crystal display device according to a second embodiment.

Next, a second embodiment will be described with reference to FIG. 2. In the following description, only components different from those in the first embodiment are described, and components identical to those in the first embodiment are assigned the same reference numerals as those in the first embodiment and are not described.

In a liquid crystal display device 40 of the second embodiment, a graphite sheet 31 is placed differently from that in the first embodiment. In this embodiment, the end portion of the graphite sheet 31 adjacent to the driver 15 (liquid crystal panel overlapping portion 31a) is placed in the same way as that in the first embodiment. However, the opposite end portion, which overlaps the reflection sheet 25 in the first embodiment, overlaps the front surface (upper surface) of the bottom portion 27a of the chassis 27 (the overlapping portion is referred to as a chassis overlapping portion 31d, one example of the light source overlapping portion) with an adhesive tape (not illustrated) therebetween. The chassis overlapping portion 31d faces the reflection sheet 25 with a space therebetween. The other components in the second embodiment are the same as those in the first embodiment.

In the liquid crystal display device 40 of the second embodiment, heat generated by the backlight 20 (LED 21) is partly transferred from the reflection sheet 25 to the chassis overlapping portion 31d of the graphite sheet 31 through an air layer and is dissipated through the chassis 27. If the driver 15 is heated to a very high temperature, the heat transferred to the liquid crystal panel over lapping portion 31a is diffused to the chassis overlapping portion 31d through the connecting portion 31b and is dissipated. With this configuration, the liquid crystal panel 11 and/or the backlight 20 is unlikely to be locally heated by the driver 15 and the LEDs 21 (LED board 22), and thus the liquid crystal display device 40 having high heat dissipation performance is obtained.

An experiment that was performed to compare the heat dissipation performance of the liquid crystal display devices disclosed herein with the heat dissipation performance of kwon liquid crystal display devices will be described.

A first example having a configuration the same as the configuration of the liquid crystal display device 10, a second example having a configuration the same as the configuration of the liquid crystal display device 40, a first comparative example, and a second comparative example were used.

The first comparative example and the second comparative example include components identical to those in the first embodiment or the second embodiment will be assigned the same reference numerals as those in the embodiments and will not be described in detail.

First Comparative Example

Figure 3:
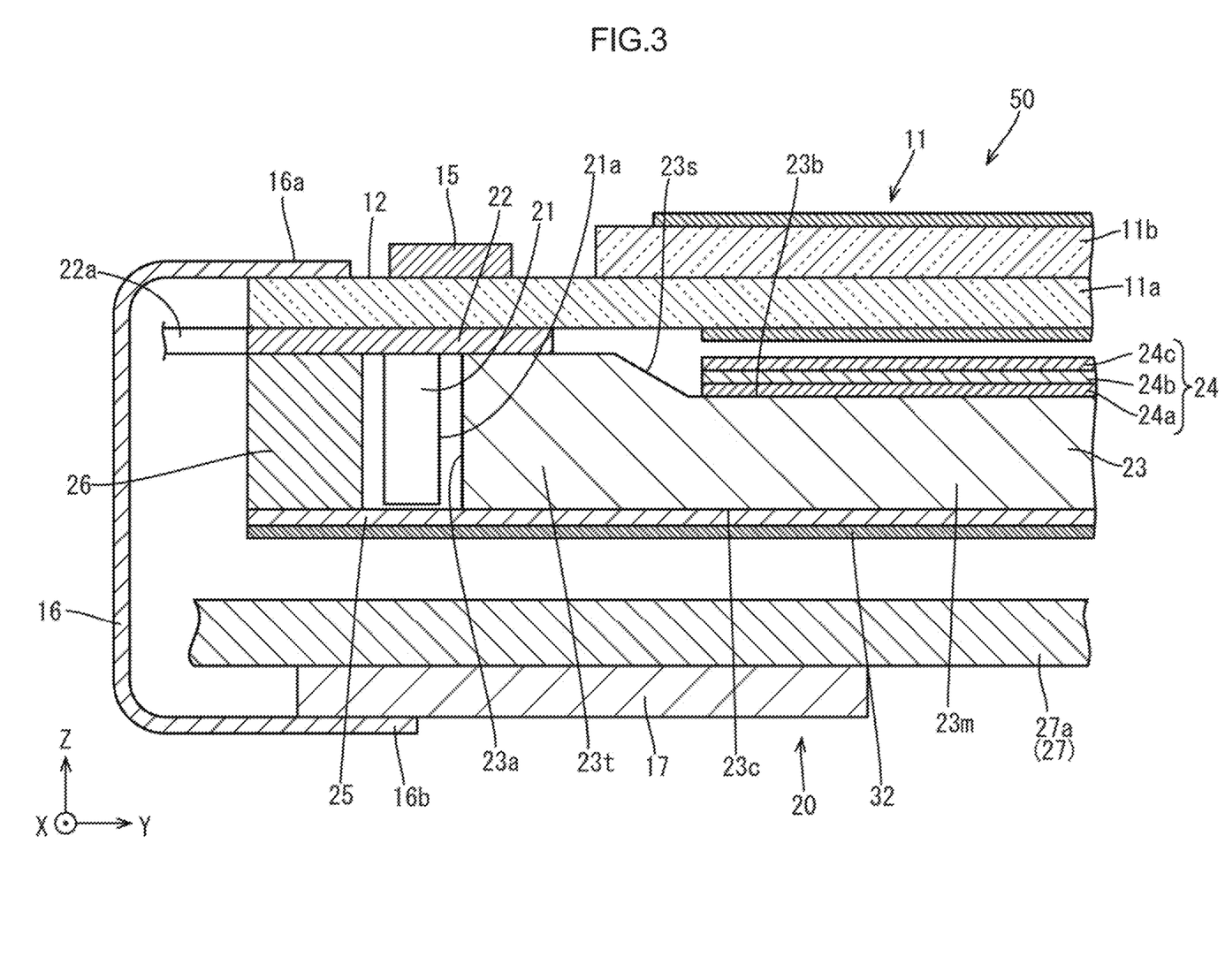
FIG. 3 is a magnified vertical cross-sectional view illustrating main components of a liquid crystal display device according to a first comparative example.

As illustrated in FIG. 3, a liquid crystal display device 50 of a first comparative example includes a graphite sheet 32 that has only a reflection sheet overlapping portion, which is the same as that in the first embodiment, and does not have a liquid crystal panel overlapping portion and a connecting portion. The other components of the first comparative example are the same as those in the first embodiment.

Second Comparative Example

Figure 4:
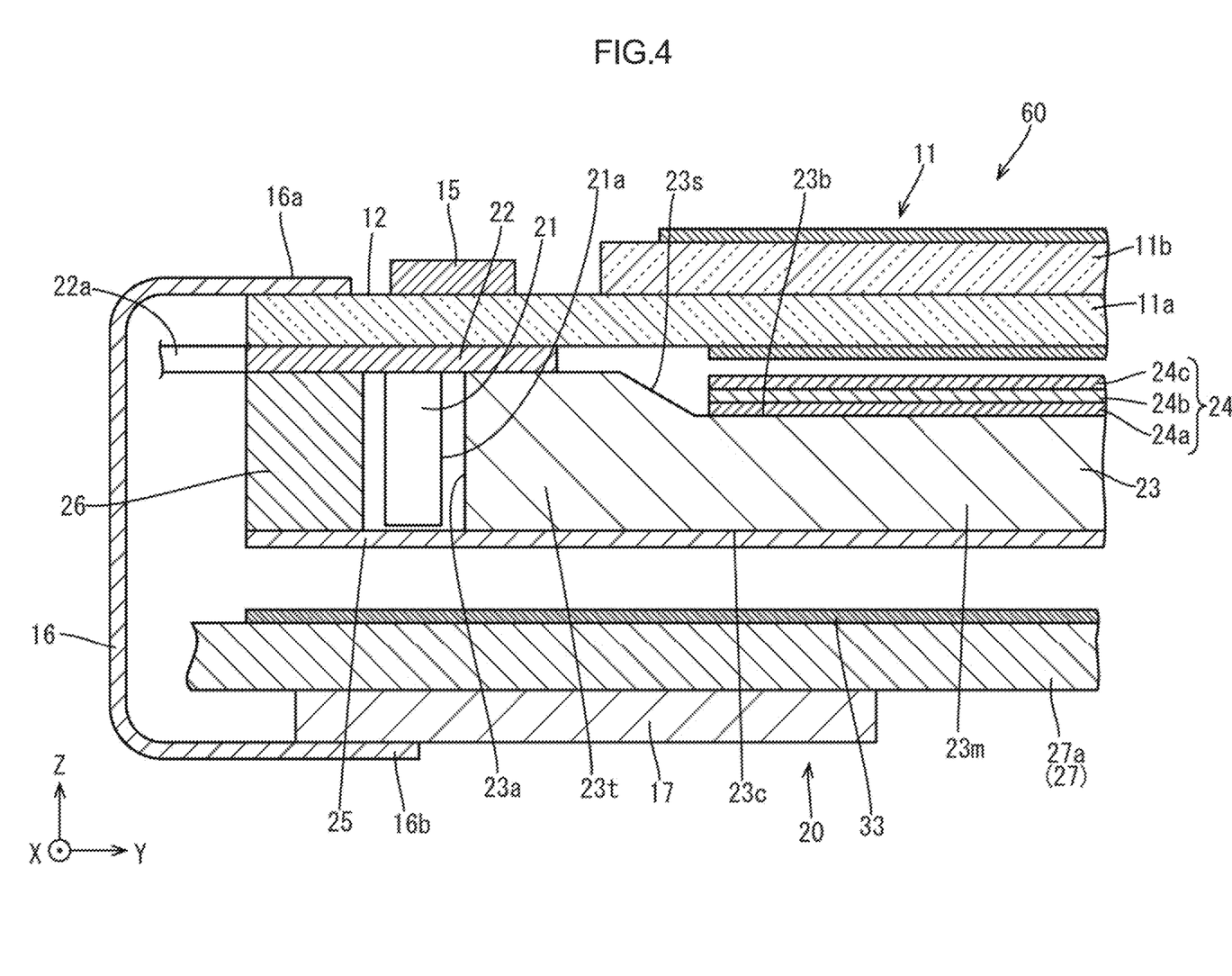
FIG. 4 is a magnified vertical cross-sectional view illustrating main components of a liquid crystal display device according to a second comparative example.

A liquid crystal display device 60 of a second comparative example includes a graphite sheet 33 that has only a chassis overlapping portion, which is the same as that in the second embodiment, and does not have a liquid crystal panel overlapping portion and a connecting portion. The other components of the second comparative example are the same as those in the second embodiment.

YouTube (registered trademark) video was continuously played on the liquid crystal display devices of the first example, the second example, the first comparative example, and the second comparative example via streaming (display frame rate of 120 fps, maximum brightness) under the following ambient conditions: an ambient temperature of 25° C.; a pressure of 1 atm; natural convection; and a Z direction gravitational force. The temperature of each of the front and rear surfaces of the liquid crystal display devices was measured when the temperature has increased to the maximum. The results are indicated in FIG. 5.

Figure 5:
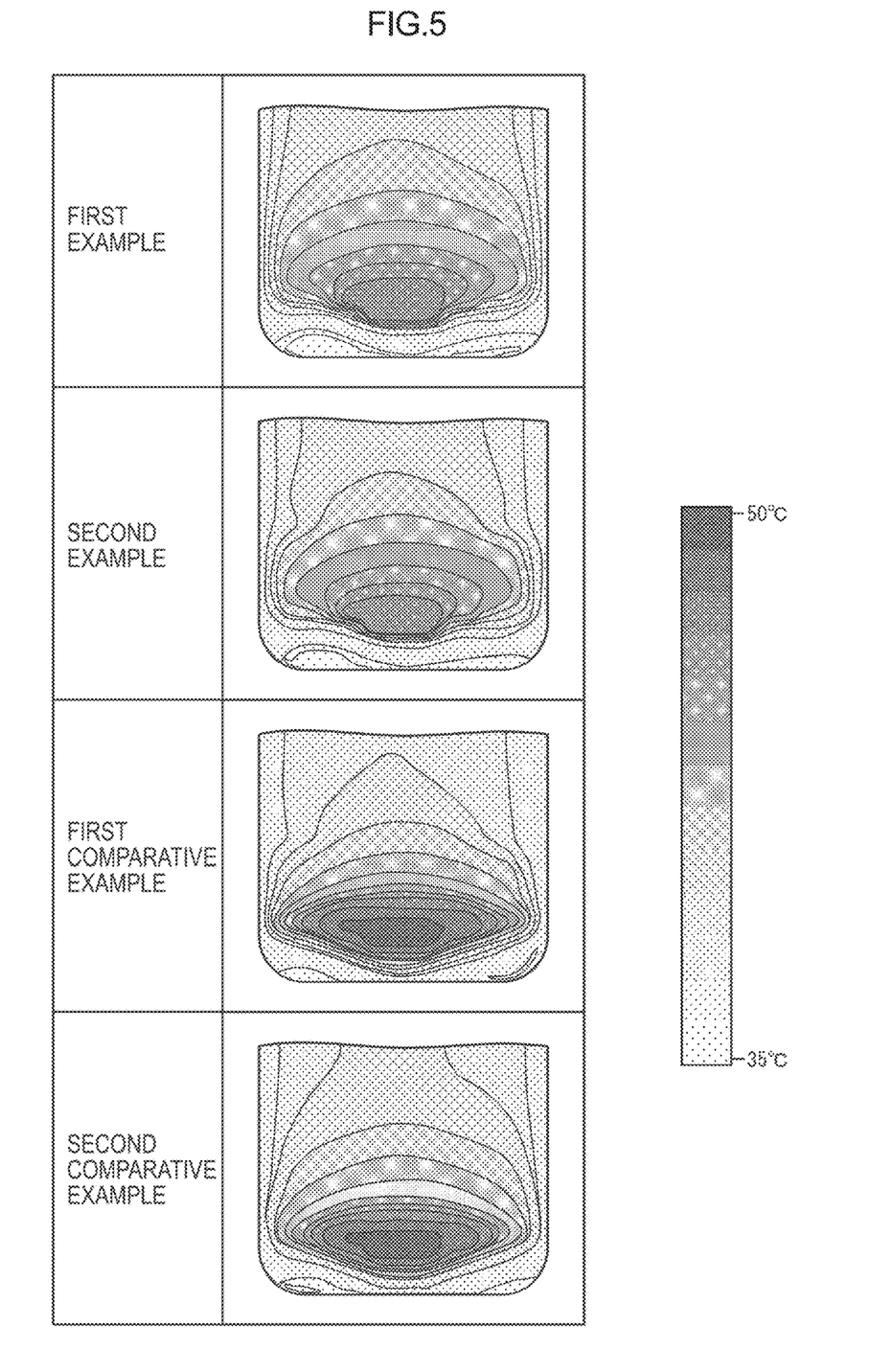
FIG. 5 shows experimental results indicating surface temperatures of the liquid crystal display devices.

FIG. 5 indicates a temperature distribution on the surface (adjacent to the liquid crystal panel) of the liquid crystal display device over the end portion adjacent to the driver 15 and the LEDs 21. As indicated in FIG. 5, the temperatures around the driver 15 in the first and second examples are lower than those in the first and second comparative examples by about eight degrees. It was confirmed that the increase in temperature was largely suppressed in the first and second examples. This is probably because that the heat generated by the driver 15 and the LEDs 21 was quickly diffused and sufficiently dissipated by the graphite sheet 30 having portions thermally connected to the liquid crystal panel 11 and the LEDs 21 and the connecting portion 30b connecting the portions to each other.

Although not indicated in FIG. 5, there is little difference in temperature of the rear surface (adjacent to the backlight 20) between the examples and the comparative examples.

The above experimental results revealed that the liquid crystal display devices of the first and second examples, which include the graphite sheet having the portions adjacent to the liquid crystal panel and adjacent to the LEDs and the connecting portion connecting the portions, have higher heat dissipation performance than the known liquid crystal display panels (first and second comparative examples).

The liquid crystal display device of the first embodiment in which the graphite sheet 30 is connected to the reflection sheet 25 is more readily assembled than the liquid crystal display device of the second embodiment in which the graphite sheet 31 is connected to the chassis 27.

OTHER EMBODIMENTS

The technology disclosed herein is not limited to the embodiments described above and with reference to the drawings. The following embodiments may be included in the technical scope.

(1) In the above-described embodiments, the LED board 22 extends along the plate surface of the light guide plate 23. However, the LED board may be positioned perpendicular to the plate surface of the light guide plate 23. In such a case, the rear surface (lower surface) of the liquid crystal panel overlapping portion 30a of the graphite sheet 30 may be disposed on the upper surfaces of the light guide plate 23 and the frame 26 or may face the light guide plate 23 and the frame 26 with a space therebetween.

Figure 6:
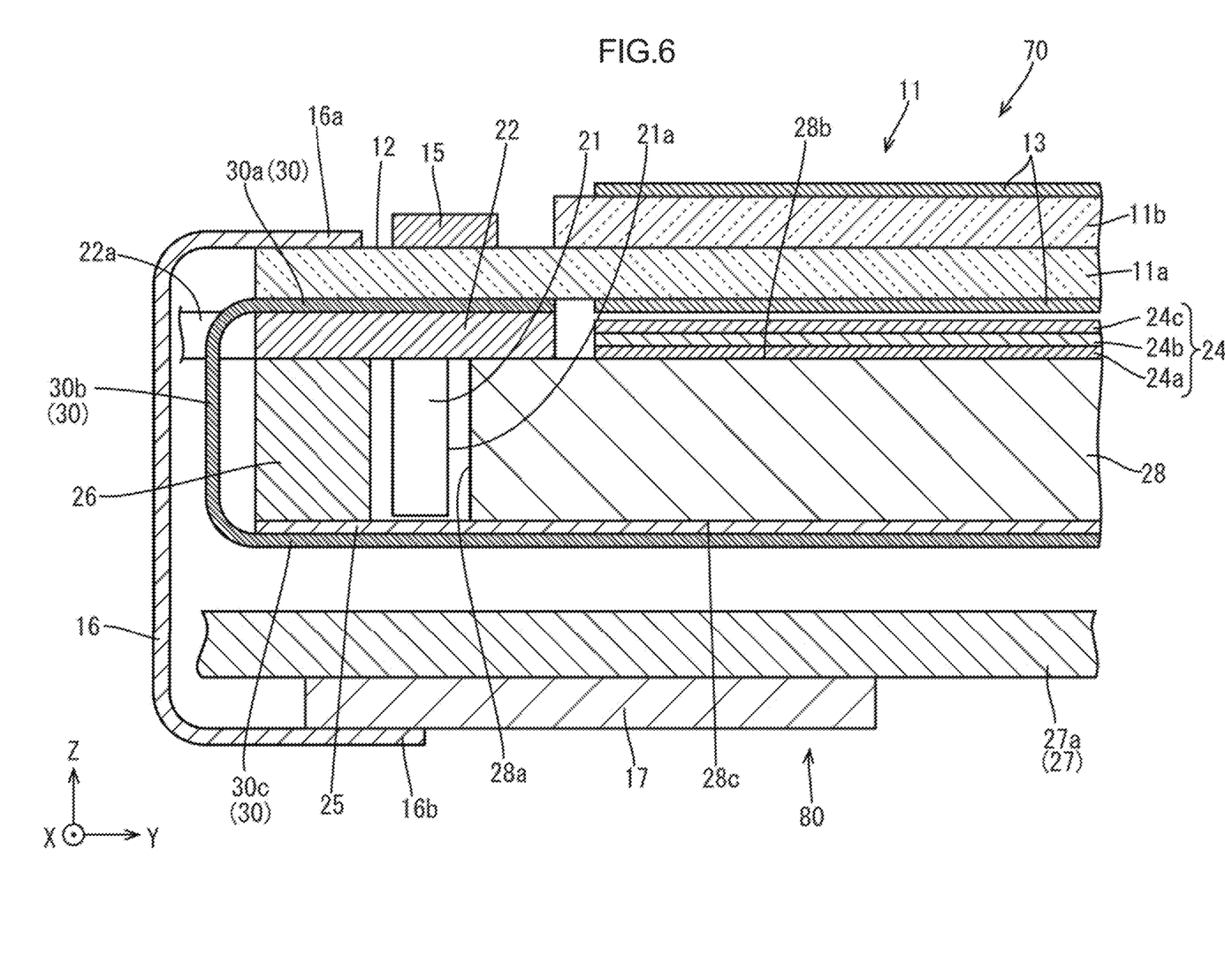
FIG. 6 is a magnified vertical cross-sectional view illustrating main components of a liquid crystal display device according to another embodiment.

(2) In the above-described embodiment, the light guide plate 23 has the thicker portion 23t. However, as illustrated in FIG. 6, the light guide plate may have a uniform thickness without the thicker portion.

(3) In the above-described embodiments, the connecting portions 30b and 31b protrude outward from the frame 26 in a direction in which the side surface of the LED 21 remote from the light guide plate 23 faces, but the connecting portion may protrude in a different direction. For example, the connecting portion may protrude outward in a direction in which the light sources are arranged (X axis direction).

(4) The configuration of the display device is not limited to that in the above-described embodiments. The display device may have a different configuration. In such a case, the display device only has to include the heatsink that is thermally connected to the display panel and the light source.

(5) In the above-described embodiments, the graphite sheet 30 is described as an example of the heatsink. However, the heatsink may be a high thermal conductive metal sheet, for example, instead of the graphite sheet.

(6) In the above-described embodiments, the LED 21 is described as an example of the light source. However, the light source may be a cold-cathode tube.

The invention claimed is:

1. A display device comprising:
a display panel including a first substrate and a second substrate on the first substrate, the first substrate including a second substrate non-overlapping portion not having the second substrate thereon and having a driving component thereon;
a backlight facing the first substrate of the display panel, the backlight including:
a light guide plate having a plate shape and facing the display panel; and
a light source facing an end surface of the light guide plate and being configured to emit light toward the end surface; and
a heatsink including a display panel overlapping portion, a light source overlapping portion, and a connecting portion, the display overlapping portion being on a rear surface of the first substrate at least over an area corresponding to the driving component, the light source overlapping portion being on a side of the backlight remote from the display panel beyond the light source, and the connecting portion connecting the display panel overlapping portion and the light source overlapping portion to each other.

2. The display device according to claim 1, wherein the backlight includes a light source board on which the light source is mounted, the light source board extends along a plate surface of the light guide plate adjacent to the display panel, and a surface of the display panel overlapping portion remote from the first substrate overlaps the light source board.

3. The display device according to claim 1, wherein the backlight includes a reflection sheet on a surface of the light guide plate remote from the display panel, and the light source overlapping portion overlaps the reflection sheet.

4. The display device according to claim 1, wherein
the backlight includes a chassis on a side of the light guide plate remote from the display panel, and
the light source overlapping portion overlaps the chassis.

5. The display device according to claim 1, wherein
the backlight includes an opposing member on a side of the light source remote from the light guide plate, and
the connecting portion is spaced apart from the opposing member.

6. The display device according to claim 1, wherein the heatsink is a graphite sheet.

7. The display device according to claim 1, wherein the first substrate is disposed on the backlight side than the second substrate.

8. The display device according to claim 2, wherein
the backlight includes an opposing member on a side of the light source remote from the light guide plate, and
the connecting portion is spaced apart from the opposing member.

9. The display device according to claim 5, wherein the connecting portion is not fixed at any positions other than a boundary with the display panel overlapping portion and a boundary with the light source overlapping portion.

10. The display device according to claim 5, wherein the opposing member has an oblong frame-like overall shape, and encloses the light source and the light guide plate.

* * * * *